(12) United States Patent
Bender et al.

(10) Patent No.: US 7,713,499 B2
(45) Date of Patent: May 11, 2010

(54) FLUIDIZED BED REACTION APPARATUS AND METHODS FOR USING THE SAME

(75) Inventors: Timothy P. Bender, Toronto (CA); David T. Borbely, Simcoe (CA); Frank Ping-Hay Lee, Oakville (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 1033 days.

(21) Appl. No.: 11/380,818

(22) Filed: Apr. 28, 2006

(65) Prior Publication Data

US 2007/0254222 A1 Nov. 1, 2007

(51) Int. Cl.
*B01J 8/18* (2006.01)
*G03G 5/00* (2006.01)

(52) U.S. Cl. .................. 422/234; 422/235; 422/239; 422/140; 430/135

(58) Field of Classification Search ............... 430/135
See application file for complete search history.

(56) References Cited

U.S. PATENT DOCUMENTS

| | | | |
|---|---|---|---|
| 4,265,990 A | | 5/1981 | Stolka et al. |
| 4,708,812 A | * | 11/1987 | Hatfield ................... 252/70 |
| 5,718,846 A | * | 2/1998 | Dummersdorf ............. 261/94 |
| 6,730,448 B2 | | 5/2004 | Yoshino et al. |
| 7,138,555 B2 | | 11/2006 | Goodbrand et al. |
| 7,196,214 B2 | | 3/2007 | Goodbrand et al. |
| 7,227,034 B2 | | 6/2007 | Bender et al. |
| 7,238,456 B2 | | 7/2007 | Bender et al. |
| 7,309,551 B2 | | 12/2007 | Tong et al. |
| 7,338,739 B2 | | 3/2008 | Qi et al. |
| 7,384,717 B2 | | 6/2008 | Dinh et al. |
| 7,390,599 B2 | | 6/2008 | Bender |
| 7,402,699 B2 | | 7/2008 | Bender et al. |
| 7,517,928 B2 | | 4/2009 | Bender et al. |
| 2004/0086794 A1 | | 5/2004 | Yamada et al. |
| 2005/0136348 A1 | | 6/2005 | Wu et al. |
| 2005/0234272 A1 | | 10/2005 | Goodbrand et al. |
| 2006/0073399 A1 | | 4/2006 | Bender et al. |
| 2006/0154161 A1 | | 7/2006 | Qi et al. |
| 2006/0222977 A1 | | 10/2006 | Goodbrand et al. |
| 2007/0100164 A1 | | 5/2007 | Coggan et al. |

(Continued)

FOREIGN PATENT DOCUMENTS

JP      A-57-128344      8/1982

(Continued)

OTHER PUBLICATIONS

C. J. Brinker and G. Scherer, *Sol-Gel Science: The Physics and Chemistry of Sol-Gel Processing* (Academic Press, Boston, 1990).

*Primary Examiner*—Jennifer A Leung
(74) *Attorney, Agent, or Firm*—Oliff & Berridge, PLC

(57) ABSTRACT

Apparatuses and methods for preparing sol-gel solutions are provided. Specifically, apparatuses include a vessel optionally containing a stirrer; a pump; a fluidized bed reaction column; and multiple fluid lines. The multiple fluid lines connect the vessel and the pump in a first circulation loop and connect the vessel, the pump and the fluidized bed reaction column in a second circulation loop. Processes for preparing sol-gel solutions using such apparatuses are also disclosed.

18 Claims, 4 Drawing Sheets

U.S. PATENT DOCUMENTS

2007/0134573 A1  6/2007  Yanus et al.

FOREIGN PATENT DOCUMENTS

| JP | B-60-22347 | 6/1985 |
| JP | A-63-65449 | 3/1988 |
| JP | A-04-15659 | 1/1992 |
| JP | B-05-47104 | 7/1993 |

* cited by examiner

FLUIDIZED BED REACTION APPARATUS AND METHODS FOR USING THE SAME

TECHNICAL FIELD

This disclosure relates to apparatuses useful for preparing sol-gel solutions and to sol-gel processes used to form photoreceptor layers, and photoreceptors including such layers. The present disclosure relates specifically to apparatuses for preparing sol-gel solutions and to efficient, scalable methods of making such sol-gel solutions, electrophotographic photoreceptors, process cartridges, and image forming apparatuses.

RELATED APPLICATIONS

Commonly assigned U.S. Patent Application Pub. No. 2005/0136348, describes a photoconductive imaging member comprising: a hole-blocking layer; a photogenerating layer; a charge-transport layer; and an optional overcoating layer; wherein at least one of the charge-transport layer and the optional overcoating layer is formed in a sol-gel process.

Commonly assigned U.S. Patent Application Pub. No. 2006/0073399, describes a silicon layer for electrophotographic photoreceptors comprising one or more siloxane-containing compound; and an antioxidant; wherein the antioxidant is at least one selected from the group consisting of hindered-phenol antioxidants, hindered-amine antioxidants, thioether antioxidants and phosphite antioxidants.

Commonly assigned U.S. Pat. No. 7,238,456, describes a silicon-containing layer for electrophotographic photoreceptors comprising: one or more siloxane-containing compound; and one or more siloxane-containing antioxidant; wherein the siloxane-containing antioxidant is at least one member selected from the group consisting of hindered-phenol antioxidants, hindered-amine antioxidants, thioether antioxidants and phosphite antioxidants.

Commonly assigned U.S. Patent Application Pub. No. 2006/0154161, describes an aromatic silicon-containing compound, having the formula (I): Ar—$[X-L-SiR_n(OR')_{3-n}]_m$ (I) wherein: Ar represents an aromatic group; X represents a divalent or trivalent group; L represents a divalent linking group; R represents a hydrogen atom, an alkyl group or an aryl group; R' represents an alkyl group having 1 to 5 carbon atoms; n is an integer of from 0 to 2; and m is an integer of from 1 to 5.

Commonly assigned U.S. Pat. No. 7,338,739, describes an electrophotographic photoreceptor comprising a charge-generating layer, a charge-transport layer, and an overcoat layer comprised of a crosslinked siloxane composite composition comprising at least one siloxane-containing compound and metal oxide particles.

Commonly assigned U.S. Pat. No. 7,309,551, describes an imaging member comprising: a substrate, a charge-generating layer, a charge-transport layer, and an external overcoating layer comprising an electron conductive material.

Commonly assigned U.S. Pat. No. 7,384,717, describes an electrophotographic imaging member comprising: a substrate, a charge-generating layer, a charge-transport layer, and an overcoating layer, said overcoating layer comprising a cured-polyester polyol or cured-acrylated polyol film forming resin and a charge transport material.

Commonly assigned U.S. Pat. No. 7,390,549, describes a silicon-containing layer comprising sol-gel polymerization products of a mixture of siloxane precursor materials that comprises one or more siloxane-containing compounds, one or more disilanol compounds and one or more alcohols.

Commonly assigned U.S. Pat. No. 7,517,928, describes an interpenetrating network comprising an organic siloxane-containing material and a polymeric binder material.

Commonly assigned U.S. Patent Application Pub. No. 2007/0134573, describes an electrophotographic imaging member comprising: a substrate, a charge-generating layer, a charge-transport layer, and an overcoating layer, said overcoating layer comprising a terphenyl arylamine dissolved or molecularly dispersed in a polymer binder.

Commonly assigned U.S. Patent Application Pub. No. 2007/0238039, describes a method for preparing aromatic silicon-containing compounds, comprising: providing an aromatic starting material; reacting said aromatic starting material with a base to form an aromatic salt; and reacting said aromatic salt with a halo-alkylene-silane to form an aromatic silicon-containing compound.

Commonly assigned U.S. Pat. No. 7,576,240, describes a process for selectively hydrogenating double and/or triple bonds in organic molecules, comprising: providing one or more acceptor molecules that contains one or more alkyl groups having one or more double bonds anchor one or more triple bonds; providing one or more hydrogen donor molecules; and hydrogenating said double bonds and/or said triple bonds of said organic molecules in the presence of one or more catalysts.

Appropriate components and process aspects of each of the foregoing, such as the sol-gel processes and solutions, and electrostatographic imaging members, apparatuses, systems and processes, may be selected for the present disclosure in embodiments thereof. The entire disclosures of the above-mentioned applications are totally incorporated herein by reference.

REFERENCES

JP-A-63-65449 (the term "JP-A" refers to an "unexamined published Japanese patent application"), discloses an electrophotographic photoreceptor in which fine silicone particles are added to a photosensitive layer, and also discloses that such addition of the fine silicone particles imparts lubricity to a surface of the photoreceptor.

Further, in forming a photosensitive layer, a method has been proposed in which a charge-transport substance is dispersed in a binder polymer or a polymer precursor thereof, and then the binder polymer or the polymer precursor thereof is cured. JP-B-5-47104 (the term "JP-B" refers to an "examined Japanese patent publication") and JP-B-60-22347, disclose electrophotographic photoreceptors using silicone materials as the binder polymers or the polymer precursors thereof.

Furthermore, in order to improve mechanical strength of the electrophotographic photoreceptor, a protective layer is formed on the surface of the photosensitive layer in some cases. A cross-linkable resin is used as a material for the protective layer in many cases. However, the protective layer formed by the cross-linkable resin acts as an insulating layer, which impairs the photoelectric characteristics of the photoreceptor. For this reason, a method of dispersing a fine, conductive metal-oxide powder (JP-A-57-128344) or a charge-transport substance (JP-A-4-15659) in the protective layer and a method of reacting a charge-transport substance having a reactive functional group with a thermoplastic resin to form the protective layer have been proposed.

However, even the above-mentioned conventional electrophotographic photoreceptors are not necessarily sufficient in electrophotographic characteristics and durability, particularly when used in combination with a charger of the contact-charging system (contact charger) or a cleaning apparatus, such as a cleaning blade.

Further, when a photoreceptor is used in combination with a contact charger and a toner obtained by chemical polymerization (polymerization toner), a surface of the photoreceptor may become stained with a discharge product produced in contact charging or with polymerization toner that remains after a transport step. This staining can deteriorate image quality in some cases. Still further, use of a cleaning blade to remove discharge product or remaining toner adhered to the photoreceptor surface increases friction and abrasion between the surface of the photoreceptor and the cleaning blade, resulting in a tendency to cause damage to the surface of the photoreceptor, breakage of the blade or turning up of the blade.

Furthermore, in producing a photoreceptor, in addition to improvement in electrophotographic characteristics and durability, reducing production costs becomes an important problem. However, conventional electrophotographic photoreceptors also may have problems relating to coating defects such as orange-peel appearances and hard spots.

The use of silicon-containing compounds in photoreceptor layers, including in photosensitive and protective layers, has been shown to increase the mechanical lifetime of electrophotographic photoreceptors, under charging conditions and scorotron charging conditions. For example, U.S. Patent Application Publication US 2004/0086794 to Yamada et al. discloses a photoreceptor having improved mechanical strength and stain resistance.

However, the above-mentioned conventional electrophotographic photoreceptors are not necessarily sufficient in electrophotographic characteristics and durability, particularly when such photoreceptors are used in an environment of high heat and humidity.

Photoreceptors having low wear rates, such as those described in Yamada, also have low refresh rates. The low wear and refresh rates are a primary cause of image-deletion errors, particularly under high-humidity and high-temperature conditions. U.S. Pat. No. 6,730,448 B2 to Yoshino et al. addresses this issue, disclosing photoreceptors having some improvement in image quality, fixing ability, even in high-heat and/or high-humidity environments. However, there still remains a need for electrophotographic photoreceptors having high mechanical strength and improved electrophotographic characteristics and improved image-deletion characteristics even under high temperature and high humidity.

The disclosures of each of the foregoing patents and publications, and the disclosures of any patents and publications cited below, are hereby totally incorporated by reference. The appropriate components and process aspects of the each of the cited patents and publications may also be selected for the present compositions and processes in embodiments thereof.

BACKGROUND

In electrophotography, an electrophotographic substrate containing a photoconductive insulating layer on a conductive layer is imaged by first uniformly electrostatically charging a surface of the substrate. The substrate is then exposed to a pattern of activating electromagnetic radiation, such as, for example light. The light or other electromagnetic radiation selectively dissipates the charge in illuminated areas of the photoconductive insulating layer while leaving behind an electrostatic latent image in non-illuminated areas of the photoconductive insulating layer. This electrostatic latent image is then developed to form a visible image by depositing finely divided electroscopic marking particles on the surface of the photoconductive insulating layer. The resulting visible image is then transferred from the electrophotographic substrate to a necessary member, such as, for example, an intermediate-transfer member or a print substrate, such as paper. This image-developing process can be repeated as many times as necessary with reusable photoconductive insulating layers.

Image-forming apparatus such as copiers, printers and facsimiles, including electrophotographic systems for charging, exposure, development, transfer, etc., using electrophotographic photoreceptors have been widely employed. In such image-forming apparatus, there are ever-increasing demands for improving the speed of the image-forming processes, improving image quality, miniaturizing and prolonging the life of the apparatus, reducing production and ruling costs, etc. Further, with recent advances in computers and communication technology, digital systems and color-image output systems have been applied also to image-forming apparatuses.

Electrophotographic imaging members or photoreceptors are well known. Photoreceptors having either a flexible belt or a rigid drum configuration art commonly used in electrophotographic processes. Photoreceptors may comprise a photoconductive layer including a single layer or composite layers. These photoreceptors take many different forms. For example, layered photo-responsive imaging members are known in the art. U.S. Pat. No. 4,265,990 to Stolka et al., which is incorporated herein by reference in its entirety, describes a layered photoreceptor having separate photo-generating and charge-transport layers. The photo-generating layer disclosed in the 990 patent is capable of photo-generating holes and injecting the photo-generated holes into the charge-transport layer. Thus, in the photoreceptors of the 990 patent, the photo-generating material generates electrons and holes when subjected to light.

More advanced photoconductive photoreceptors containing highly specialized component layers are also known. For example, multi-layered photoreceptors may include one or more of a substrate, an undercoating layer, an intermediate layer, an optional hole- or charge-blocking layer, a charge-generating layer (including a photo-generating material in a binder) over an undercoating layer and/or a blocking layer, and a charge-transport layer (including a charge-transport material in a binder). Additional layers, such as one or more overcoat layer or layers, may be included as well. In view of such a background, improvement in electrophotographic properties and durability, miniaturization, reduction in cost, etc., in photoreceptors have been studied, and photoreceptors using various materials have been proposed.

As discussed above, silicon-containing compounds used in photoreceptor layers, such as in photosensitive and protective layers, have been shown to increase the mechanical lifetime of photoreceptors, under charging conditions and scorotron-charging conditions. However, there are shortcomings associated with photoreceptor layers that include silicon-containing compounds, including cross-linked siloxane-containing overcoat layers. For example, sol-gel solutions for making such layers must be prepared at the site at which the layers are prepared, because polymerization of the sol-gel solutions must be carried out during layer formation.

Sol-gel processes are generally known in the art, and embodiments of this disclosure include apparatuses and methods for preparing sol-gel solutions. In exemplary known processes, compositions formed by sol-gel processes and solutions comprise an organic-inorganic composite structure, generally characterized as an inorganic glassy polymer having an organic material dispersed in or interpenetrated into and/or chemically bonded into the inorganic polymer network.

The organic-inorganic composite structure includes a glassy polymer, such as an inorganic silica polymer such as a silica glass structure. The glassy polymer is prepared by a solution-gelation (or "sol-gel") process during which hydrolysis, followed by condensation polymerization, of a silicon alkoxide takes place in the presence of water and an alcohol. The general process for forming sol-gels is taught, for example, in C. J. Brinker and G. Scherer, *Sol-Gel Science: The Physics and Chemistry of Sol-Gel Processing* (Academic Press, Boston, 1990). This two-step reaction process, which transforms a miscible one-phase liquid solution into a two-phase material, is called "sol-gel transition". Generally, the silicon alkoxide/water/alcohol mixture is slow to hydrolyze. The hydrolysis rate is a function of the solution pH and, therefore, may be controlled by the addition of an acid or base as a catalyst. The reaction mixture can further include other materials, such as organic monomers or polymers or other additives, which can become either chemically bound into the glassy polymer network, or entrapped in the glassy polymer structure.

As is known in the sol-gel art, solution pH may influence the properties of the formed glassy polymer gel. Polymerization in an alkaline solution generally yields a polymer gel that is relatively porous and translucent, and is characterized by clusters of oxides of, for example, Al, B, Si, Sn, Ti, or Zr such as for example, silica, titania, alumina, zirconia, and aluminum phosphate, that are inked together to form the gel. Polymerization in an acidic solution, on the other hand, generally yields a transparent polymer gel that is characterized by a very fine porosity and by uniform, linear molecules that coalesce during subsequent sintering to form a high-density material at relatively low temperatures (e.g., about 800° C.).

Polymer gels formed by the sol-gel process are two-phase materials, denoted "alcohols," one phase of which contains a solid siloxane skeletal network (i.e., $(-Si-O-Si-)_n$), and an aqueous phase containing water and alcohol in the pores. Once the alcohol is formed, it is dried by slowly heating the gel to vaporize the volatile species, such as alcohol. By properly driving off the volatile species by natural evaporation, the formed polymer gel comprises a two-phase, rigid xerogel (a gel containing an oxide skeleton and micropores). The number and size of the pores found in the final glass product (and, thus, the density of the final glass product) are a function of the rate of heating, the ultimate sintering temperature, and the period of time the xerogel is maintained at the ultimate sintering temperature. In sol-gel processes, an acid catalyst is generally used to speed the sol-gel reactions.

When used in applications relating to photoreceptor layers, sol-gel reaction components, and any desired additives, are mixed with conventional photoreceptor layer materials. The hydrolysis of the sol-gel reaction components takes place its situ in the coating solution. After coating, solvents used in the process evaporate, and a desired thin film forms. The condensation of the sol-gel reaction components takes place in situ during thermal drying, and an organic-inorganic interpenetrating network is formed, which unexpectedly provides better wear resistance, deletion control and other benefits.

However, these sol-gel formulations for preparing siloxane-containing materials, for example, can involve processes in which large volume changes may take place. Such issues make scaling sol-gel procedures beyond a laboratory scale difficult.

Thus, there remains a need for improved, scalable apparatuses and methods for preparing sol-gel solutions that will produce high yields of the desired sol-gel solutions having the electrical and physical properties on a large scale that are obtained on a laboratory scale.

SUMMARY

The present disclosure addresses these and other needs, by providing an apparatus for preparing sol-gel solutions, in which reactants can be circulated through a first loop and completely blended and then circulated through a second loop that includes a fluidized bed reaction column having a catalytic solid state material to react the reactants.

Exemplary apparatuses include apparatuses for preparing sol-gel solutions, comprising a vessel optionally containing a stirrer; a pump; a fluidized bed reaction column; and multiple fluid lines; wherein the fluid lines connect the vessel and the pump in a first circulation loop and the fluid lines connect the vessel, the pump and the fluidized bed reaction column in a second circulation loop.

Exemplary processes include methods for preparing a sol-gel solution, comprising: providing an apparatus that comprises: a vessel optionally containing a stirrer, a pump, a fluidized bed reaction column having an upper portion, a body and a lower portion, and multiple fluid lines, wherein the fluid lines connect the vessel and the pump in a first circulation loop and the fluid lines connect the vessel, the pump and the fluidized bed reaction column in a second circulation loop, the upper portion and the body are separated by a first fluid permeable membrane; the lower portion is connected to the fluid lines by a connector, and the lower portion and the connector are separated by a second fluid permeable membrane; and the body contains a solid state acid catalyst that is not permeable through the first fluid permeable membrane or the second fluid permeable membrane; providing sol-gel precursor materials to the vessel; blending the sol-gel precursor materials, water and methanol with an optional solvent; circulating the mixture through a first circulation loop; and reacting the sol-gel precursor materials by circulating the mixture through the second circulation loop and contacting the sol-gel precursor materials with the solid state acid catalyst.

These and other features and advantages of various embodiments of materials, devices, systems and/or methods are described in or are apparent from, the following detailed description.

EMBODIMENTS

Figure 1:
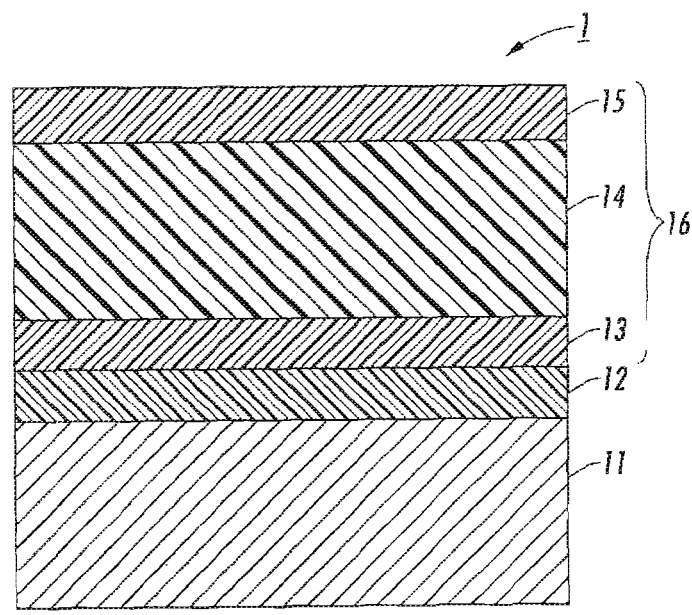
FIG. 1 is a schematic cross sectional view showing an embodiment of an electrophotographic photoreceptor of the disclosure.

This disclosure is not limited to particular embodiments described herein, and some components and processes may be varied, based on this disclosure. The terminology used herein is for the purpose of describing particular embodiments only, and is not intended to be limiting.

In this specification and the claims that follow, singular forms such as "a," "an," and "the" include plural forms unless the content clearly dictates otherwise. Unless specifically disclaimed, all numerical ranges include the endpoints and all specific values and sub-ranges between the endpoints, as well as those values approximating or equivalent to the specifically mentioned endpoints, values and ranges.

Reference may be made to a number of terms that shall be defined as follows:

The term "room temperature" refers, for example, to temperatures in a range of from about 20° C. to about 25° C. The terms "high temperature environment" and "high temperature conditions" refer, for example, to an atmosphere in which the temperature is at least about 28 or about 30° C., and may be as high as about 300° C. The terms "high humidity environment" and "high humidity conditions" refer, for example, to an atmosphere in which the relative humidity is at east about 75 or about 80%.

The term "organic molecule" refers, for example, to any molecule that is made up predominantly of carbon and hydrogen, such as, for example, alkanes and arylamines. The term "heteroatom" refers, for example, to any atom other than carbon and hydrogen. Typical heteroatoms included in organic molecules include oxygen, nitrogen, sulfur and the like.

The terms "hydrocarbon" and "alkane" refer, for example, to branched and unbranched molecules having the general formula $C_nH_{2n+2}$, in which n is a number of 1 or more, such as of from about 1 to about 60. Exemplar alkanes include methane, ethane, n-propane, isopropane, n-butane, isobutane, tert-butane, octane, decane, tetradecane, hexadecane, eicosane, tetracosane and the like. Alkanes may be substituted by replacing hydrogen atoms with one or more functional groups. The term "aliphatic" refers, for example, to straight-chain molecules, and may be used to describe acyclic, unbranched alkanes. The term "long-chain" refers, for example, to hydrocarbon chains in which n is a number of from about 8 to about 60, such as from about 20 to about 45 or from about 30 to about 40. The term "short-chain" refers, for example, to hydrocarbon chains in which n is a number of from about 1 to about 7, such as from about 2 to about 5 or from about 3 to about 4.

The term "saturated" refers, for example, to compounds containing only single bonds. The term "unsaturated" refers, for example, to compounds that contain one or more double bonds and/or one or more triple bonds.

The term "alkyl" refers, for example, to a branched or unbranched saturated hydrocarbon group, derived from an alkane and having the general formula $C_nH_{2n+1}$, in which n is a number of 1 or more, such as of from about 1 to about 60. Exemplary alkyl groups include methyl, ethyl, n-propyl, isopropyl, n-butyl, isobutyl, tert-butyl, octyl, decyl, tetradecyl, hexadecyl, eicosyl, tetracosyl and the like. The term "lower alkyl" refers, for example, to an alkyl group of from about 1 to about 12 carbon atoms. "Halogenated alkyl" refers, for example, to an alkyl group in which at least one hydrogen atom, and optionally all hydrogen atoms, is replaced by a halogen atom.

The term "alkylene" refers, for example, to a branched or unbranched saturated hydrocarbon group of about 1 to about 12 carbon atoms and having two bonds to other portions of the molecule. Exemplary alkylene groups have the structure —$(CH_2)_a$—, in which a is an integer in a range of from about 1 to about 12.

The term "alkenyl" refers, for example, to a branched or unbranched hydrocarbon chain containing from about 2 to about 24 carbon atoms and at least one double bond. "Lower alkenyl" refers, for example, to an alkenyl group of about 2 to about 6 carbon atoms. "Halogenated alkenyl" refers, for example, to an alkenyl group in which at least one hydrogen atom, and optionally all hydrogen atoms, is replaced by halogen atoms.

The term "alkoxy" refers, for example, to an alkyl group bound through a single, terminal ether linkage; that is, an "alkoxy" group is defined as —OR in which R is an alkyl as defined above. A "lower alkoxy" refers, for example, to an alkoxy group containing 1 to about 6 carbon atoms.

The term "siloxane" refers, for example, to compounds containing silicon atoms bound to oxygen atoms and to organic groups. Exemplary siloxanes have the structure ROSiR'R"R'", in which O represents oxygen, Si represents silicon and R, R', R" and R'" represent independently selected organic groups, such as alkyl, alkenyl, alkynyl, alkoxy and other suitable groups.

The term "aromatic" refers, for example, to an organic molecule or radical in which some of the bonding electrons are delocalized or shared among several atoms within the molecule and not localized in the vicinity of the atoms involved in the bonding. Aromatic compounds may include heteroatoms in the molecules, and may include one or more cyclic or ring systems that may include one or more fused aromatic rings. Examples of aromatic compounds include, for example, benzene ($C_6H_6$), naphthalene ($C_{10}H_8$), anthracene ($C_{14}H_{10}$), pyridine ($C_5H_5N$) and the like. Optionally, these aromatic compounds may be substituted with one or more independently selected substituents, including alkyl, alkenyl, alkoxy, aryl, hydroxyl and nitro groups.

The term "aryl" refers, for example, to an organic group derived from an aromatic compound and having the same general structure as the aromatic compound. Examples of aromatic compounds include, for example, phenyl ($C_6H_5$), benzyl ($C_7H_7$), naphthyl ($C_{10}H_7$), anthracyl ($C_{14}H_9$), pyridinyl ($C_5H_4N$) and the like. Optionally, these aromatic groups may be substituted with one or more independently selected substituents, including alkyl, alkenyl, alkoxy, aryl, hydroxyl and nitro groups.

The term "aralkylene" refers, for example, to moieties containing both alkylene and monocyclic species, typically containing less than about 12 carbon atoms in the alkylene portion, and wherein the aryl substitutent is bonded to the structure of interest though an alkylene linking group. Exemplary aralkylene groups have the structure —$(CH_2)_a$—Ar, in which Ar represents an aryl group and a is an integer in a range of from 1 to about 6.

The term "arylamine" refers, for example, to moieties containing both aryl and amine groups. Exemplary aralkylene groups have the structure Ar—NRR', in which Ar represents an aryl group and R and R' are groups that may be independently selected from hydrogen and substituted and unsubstituted alkyl, alkenyl, aryl and other suitable functional groups. The term "triarylamine" refers, for example, to arylamine compounds having the general structure NArAr'Ar", in which Ar, Ar' and Ar" represent independently selected aryl groups.

"Alcohol" refers, for example, to an alkyl moiety in which one or more of the hydrogen atoms has been replaced by an —OH group. The term "lower alcohol" refers, for example, to an alkyl group of about 1 to about 6 carbon atoms in which at least one, and optionally all, of the hydrogen atoms has been replaced by an —OH group. The term "primary alcohol" refers, for example to alcohols in which the —OH group is bonded to a terminal or chain-ending carbon atom, such as in methanol, ethanol, 1-propanol, 1-butanol, 1-hexanol and the like. The term "secondary alcohol" refers, for example to alcohols in which the —OH group is bonded to a carbon atom that is bonded to one hydrogen atom and to two other carbon atoms, such as in 2-propanol (isopropanol), 2-butanol, 2-hexanol and the like, The term "tertiary alcohol" refers, for example to alcohols in which the —OH group is bonded to a carbon atom that is bonded to three other carbon atoms, such as in methylpropanol (tert-butanol) and the like.

"Amine" refers, for example, to an alkyl moiety in which one or more of the hydrogen atoms has been replaced by an —NH$_2$ group. The term "lower amine" refers, for example, to an alkyl group of about 1 to about 6 carbon atoms in which at least one, and optionally all, of the hydrogen atoms has been replaced by an —NH$_2$ group.

The term "derivative" refers, for example, to compounds that are derived from another compound and maintain the same general structure as the compound from which they are derived. For example, saturated alcohols and saturated amines are derivatives of alkanes.

The term "homologous" refers, for example, to any number of series of organic compounds that have similar chemical properties and that differ by a constant relative molecular mass. For example, lower alcohols are a homologous series that includes CH$_3$OH, CH$_3$CH$_2$OH, CH$_3$CH$_2$CH$_2$OH, CH$_3$(CH$_2$)$_2$CH$_2$OH, CH$_3$(CH$_2$)$_3$CH$_2$OH and CH$_3$(CH$_2$)$_4$CH$_2$OH, as well as isomers of these molecules.

The terms "halogen" or "halogen atom" refer, for example, to atoms of the elements fluorine (F), chlorine (Cl), bromine (Br), iodine (I) and astatine (At). The term "halo" refers, for example, to substitution of a halogen atom for a hydrogen atom in an organic compound. "Haloalkyl" refers, for example, to an alkyl moiety in which one or more of the hydrogen atoms has been replaced by a halogen atom. The term "lower haloalkyl" refers, for example, to an alkyl group of about 1 to about 6 carbon atoms in which at least one, and optionally all, of the hydrogen atoms has been replaced by a halogen atom. The term "perhalogenated" refers, for example, to a compound in which all of the hydrogen atoms have been replaced by halogen atoms, while the phrase "partially halogenated" refers, for example, to a compound in which less than all of the hydrogen atoms have been replaced by halogen atoms.

The term "heterogeneous reaction" refers, for example, to a reaction in which there is an interface between the reactants, such as reactions between a gas and a solid, a liquid and a gas, a solid and a liquid, two immiscible liquids, or two different solids.

"Optional" or "optionally" refer, for example, to instances in which subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than one of the subsequently described circumstances occurs.

Sol-gel formulations for preparing siloxane-containing materials, for example, are known to involve multi-step processes that can include steps of combining the component materials, including at least one silicon-containing material, exchanging silicon-substituent groups for more reactive substituents, polymerizing the component materials, and stabilizing the reaction system. On a laboratory scale, such processes are conducted in a reaction vessel chosen to accommodate any volume changes that may take place. On larger scales, however, accommodating large volume changes by using very large reaction vessels or by transferring reaction mixtures between vessels can be costly and difficult.

This disclosure provides scalable apparatuses and systems for the formulation of sol-gel solutions, as well as methods for producing sol-gel solutions using such apparatuses and systems. The apparatuses and processes of embodiments are generally applicable to sol-gel systems; however, for exemplary purposes, the specific embodiments disclosed herein are described with respect to photoreceptor layers and their preparation. In particular, this disclosure relates to novel apparatuses utilizing fluidized bed reaction columns suitable for preparation of any sol-gel solution. Exemplary apparatuses utilizing fluidized bed reaction columns will be described first, followed by descriptions of sol-gel processes utilizing such apparatuses.

Figure 4:
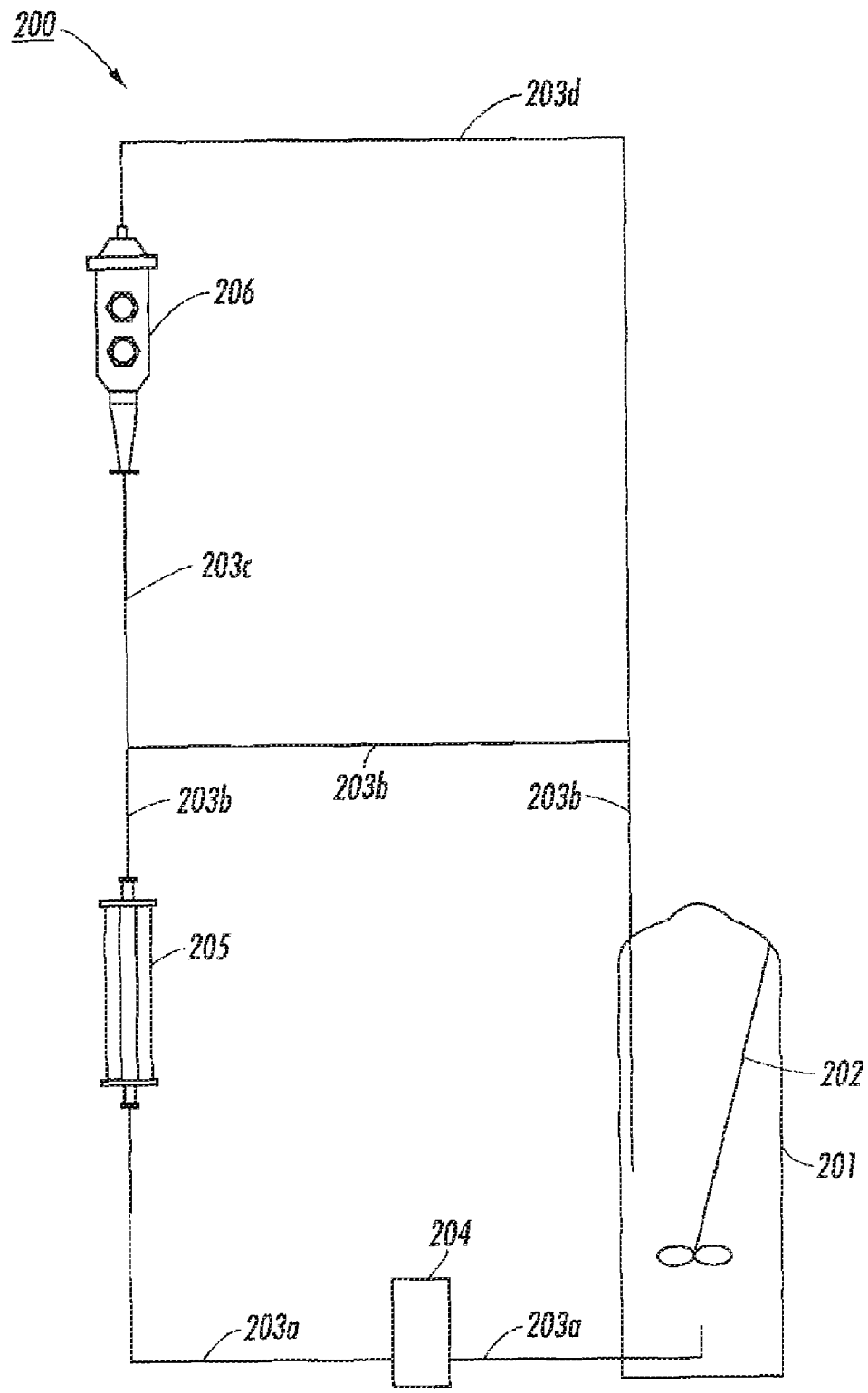
FIG. 4 is a schematic view showing an embodiment of a sol-gel solution preparation system of the disclosure.

In embodiments, an apparatus comprises a vessel containing a stirring means, a pump, an optional heat exchanger, a fluidized bed reaction column and fluid lines. Exemplary apparatuses, such as the apparatus shown in FIG. 4, may be constructed to allow two or more circulation loops by which fluid and reactants may be circulated through the apparatus. For example, a suitable apparatus 200 may include a vessel 201 that has a stirring means 202 within the vessel. The vessel 201 is connected to a fluid line 203a that contains a pump 204 and connects to an optional heat exchanger 205. The heat exchanger 205 in turn connects to another fluid line 203b that connects to the vessel 201. This defines a first circulation loop. A second circulation loop of the apparatus 200 includes vessel 201, fluid line 203a, pump 204, optional heat exchanger 205 and fluid line 203b. In addition, the second circulation loop includes fluid line 203c, which connects to fluid line 203b and to fluidized bed reaction column 206, which then connects through fluid line 203d to fluid line 203b and vessel 201.

Figure 5:
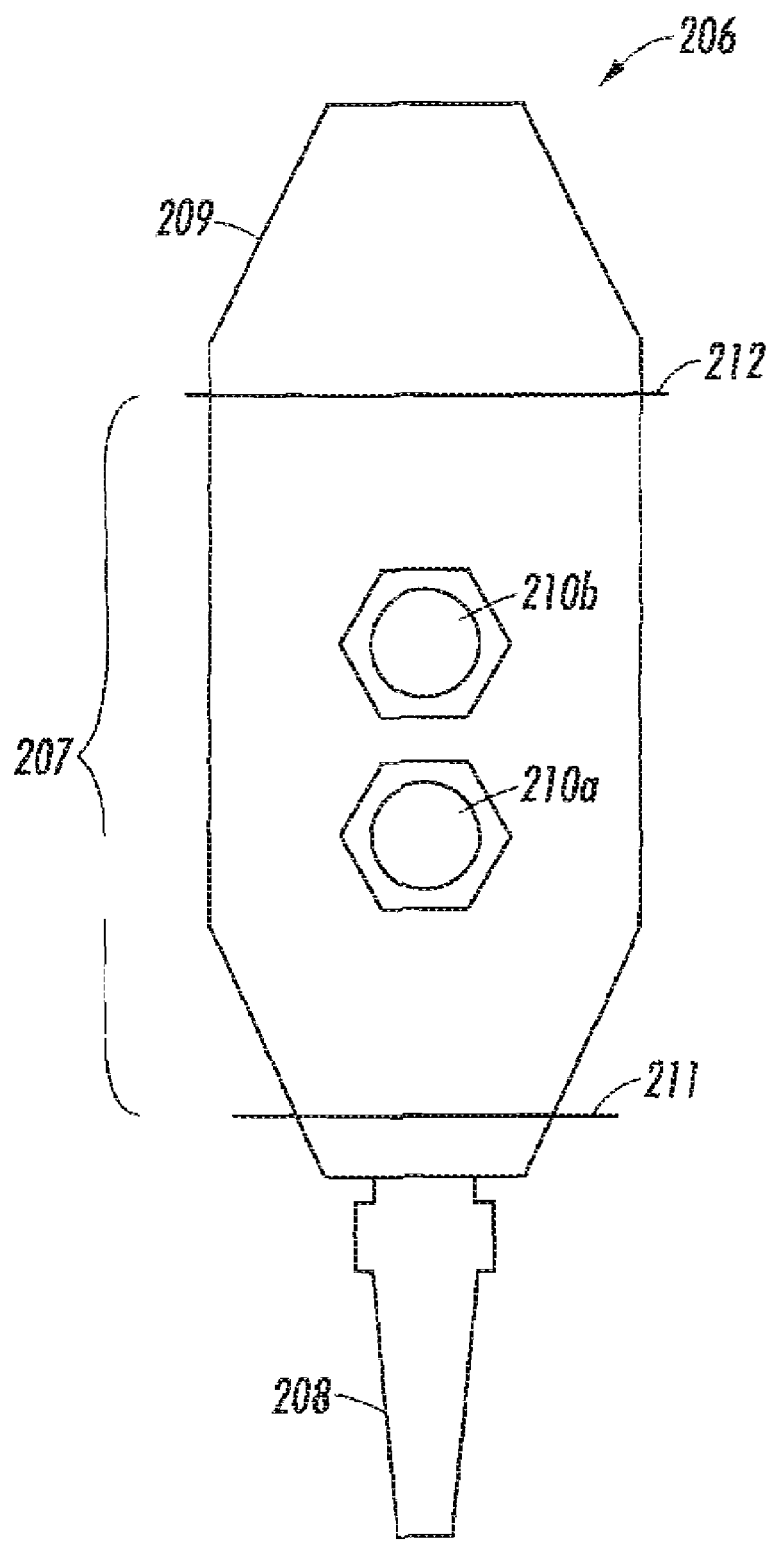
FIG. 5 is a schematic view an exemplary fluidized bed reaction apparatus of the disclosure.

In exemplary apparatuses, the fluidized bed reaction column 206, such as that shown in FIG. 5, may have a body 207 that has a generally cylindrical shape and has a lower portion having a substantially conical shape. This lower portion has a substantially conical shape to allow fluidization of solid state materials within the body 207. This lower portion may be truncated and may contain a connector 208, which connects the body 207 to fluid line 203c, and a screen or membrane between the lower portion and the connector 208. The body 207 may also contain an upper portion that connects the body 207 to fluid line 203d and an additional screen or membrane 212 between the body 207 and the upper portion 209. The body 207 may also include a lower window 210a and/or an upper window 210b, through which reaction in and flow through the fluidized bed reaction column 206 may be observed.

In exemplary apparatuses, lower portion of the body 207 may have portions that are substantially cylindrical and/or substantially conical in shape. The lower portion of the body 207 may have, in embodiments, a truncated conical shape in which an angle at a projected vertex of the conical shape is from about 1 to about 175 degrees, such as from about 30 to about 90 degrees or from about 40 to about 60 degrees.

In exemplary apparatuses, upper portion 209 of the body 207 may have a substantially conical shape. The substantially conical shape may be in embodiments, a truncated conical shape in which an angle at a projected vertex of the conical shape is from about 1 to about 175 degrees, such as from about 45 to about 160 degrees or from about 60 to about 115 degrees.

In exemplary apparatuses, screens or membranes 211 and 212 are permeable to fluids used in the apparatuses; that is, screens or membranes 211 and 212 allow fluids and materials dissolved in the fluids to flow through the screens or membranes 211 and 212. However, screens or membranes 211 and 212 are not permeable to solid materials and materials that are not dissolved in the fluids; such solid materials and materials that are not dissolved in the fluids cannot pass through screens or membranes 211 and 212.

In exemplary apparatuses, the fluidized bed reaction column 206, may contain one or more solid state materials in body 207. Such solid state materials cannot pass through screens or membranes 211 and 212. In embodiments, the solid state materials may be solid state catalysts useful for sol-gel reaction systems.

In embodiments, the first circulation loop of apparatus 200 may allow for circulation of reactants without exposure to any solid state materials in the fluidized bed reaction column 206. Thus, reactants may be completely blended and circulated through the first circulation loop without passing through fluidized bed reaction column 206. The second circulation loop of the apparatus of exemplary embodiments allows reactants to circulate through fluidized bed reaction column 206, contacting any solid state materials, such as catalysts, that may be contained within the fluidized bed reaction column 206.

In embodiments, fluidized bed reaction column 206 may have a geometry such that the solid state material forms a fluidized bed column with an expansion that is variable with fluid flow rate. For example, in embodiments, the solid state material may form fluidized bed column that expands to approximately three times its original volume when fluid flow rate is approximately 3.3 L/min. Embodiments of this disclosure includes variations in the flow rate to produce a "lean" expansion of the solid state material, in which each solid state particle has little or no contact with its nearest neighboring solid state particles, or a "dense" expansion of the solid state material, in which each solid state particle is in direct physical contact with one or more of its nearest neighboring solid state particles. In particular embodiments, the flow rate may be adjusted to produce a "lean" expansion of the solid state material.

In processes for sol-gel preparation, solid state materials may be provided to fluidized bed reaction column 206. Suitable solid state materials are fluidizable powder or granular materials, and such solid state materials may be used for preparation of multiple sol-gel formulations.

In embodiments, the solid state materials may comprise solid state catalysts, such as acid catalysts, basic catalysts, and solid state catalysts that contain chemical elements physically or chemically absorbed onto the surface, so that these chemical elements (which may have acidic or basic properties) affect hydrolysis and condensation of reactive siloxane materials in the presence of water. Such solid state catalysts may be organic catalysts, such as those sold under the AMBERLYST trademark by Rohm & Haas, or inorganic, such as certain clays and/or zeolites that will be identifiable by those of skill in the art. As suitable solid state catalysts, any of the known or after-developed solid state catalysts can be used. Suitable solid state catalysts include ion exchange resins, such as those commercially available under the trademark AMBERLYST (Rohm & Haas). By changing the amount of catalyst present, one of ordinary skill will be able to adjust the reaction kinetics for reactions in sol-gel processes of embodiments.

In processes for sol-gel preparation that may be conducted in apparatuses such as exemplary apparatus 200, sol-gel precursor materials may be introduced into vessel 201. As suitable precursor sol-gel materials, any of the known or after-developed desirable materials can be used. Suitable sol-gel precursor materials include reactive siloxane-containing hole-transport materials and reactive siloxane-containing binder materials, and other known compounds that may be used in sol-gel solutions, as well as mixtures thereof. The binder materials may be, in embodiments, reactive siloxane materials and may include between 2 and 4 reactive alkoxide residues around a tetravalent silicon atom, with the remaining valencies containing hydrocarbon residues. In embodiments, the sol-gel precursor materials include one or more reactive siloxane-containing hole-transport materials and one or more reactive siloxane-containing binder materials.

Suitable reactive siloxane-containing binder materials for use in embodiments include aromatic silicon-containing compounds, such as aromatic silane compounds, i.e., a compound having one or more silane groups separated by a linking group that is or contains one or more aromatic groups. For example, the aromatic silicon-containing compound can generally be represented by the following formula (I):

$$Ar-[X-L-SiR_n(OR')_{3-n}]_m \qquad (I)$$

In formula (I) Ar represents an aromatic group, which can have one or more phenyl groups. Suitable examples of Ar include, but are not limited to the following structures (II-1) to (II-44):

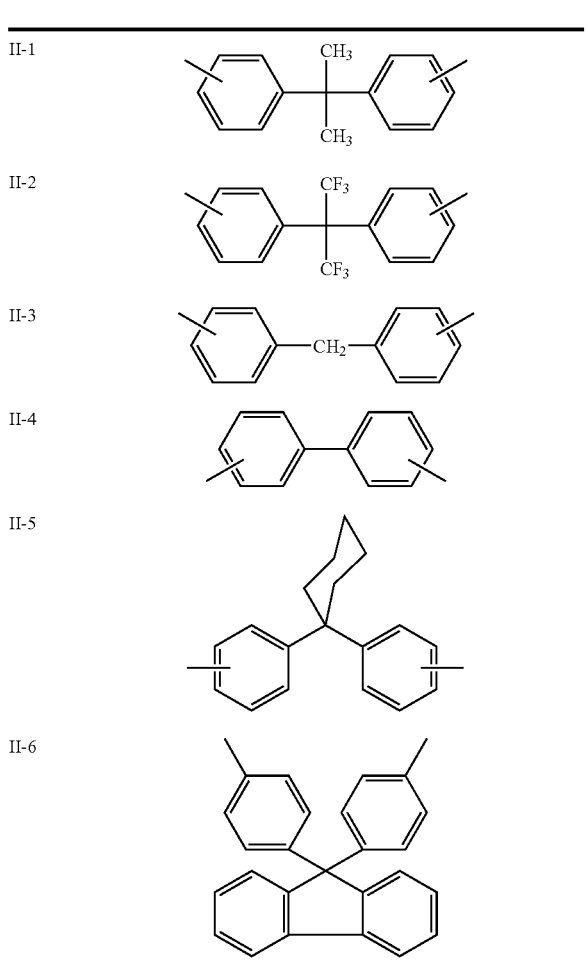

-continued
II-7 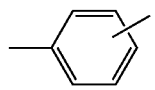
II-8 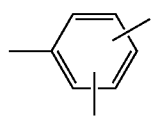
II-9 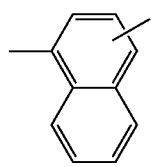
II-10 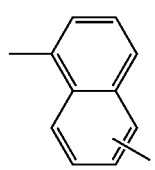
II-11 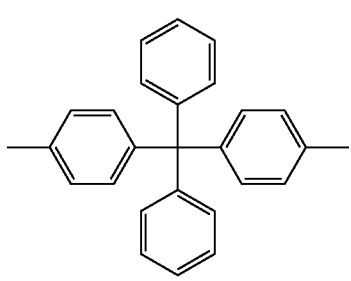
II-12 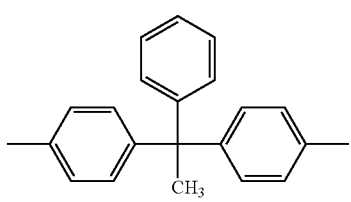
II-13 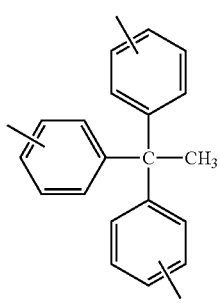
II-14 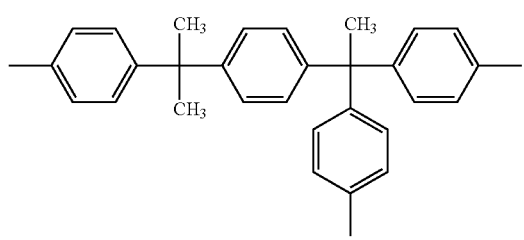
-continued
II-15 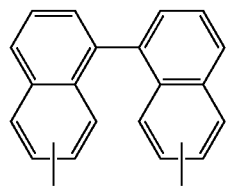
II-16 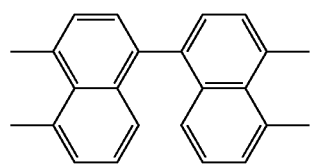
II-17 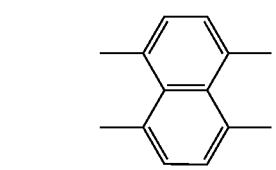
II-18 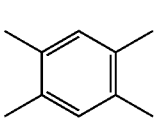
II-19 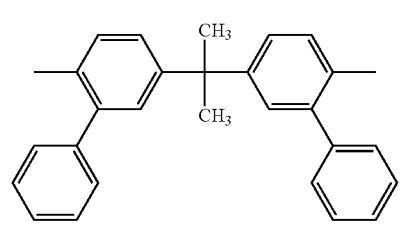
II-20 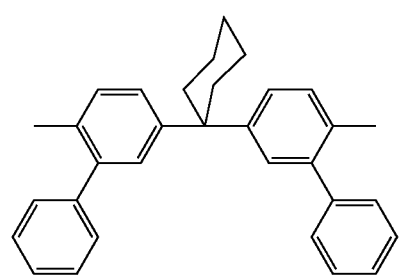
II-21 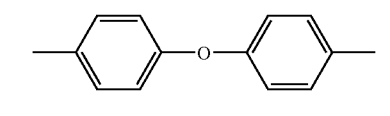
II-22 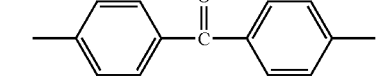
II-23 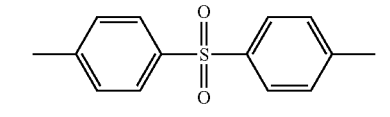
II-24 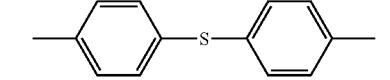

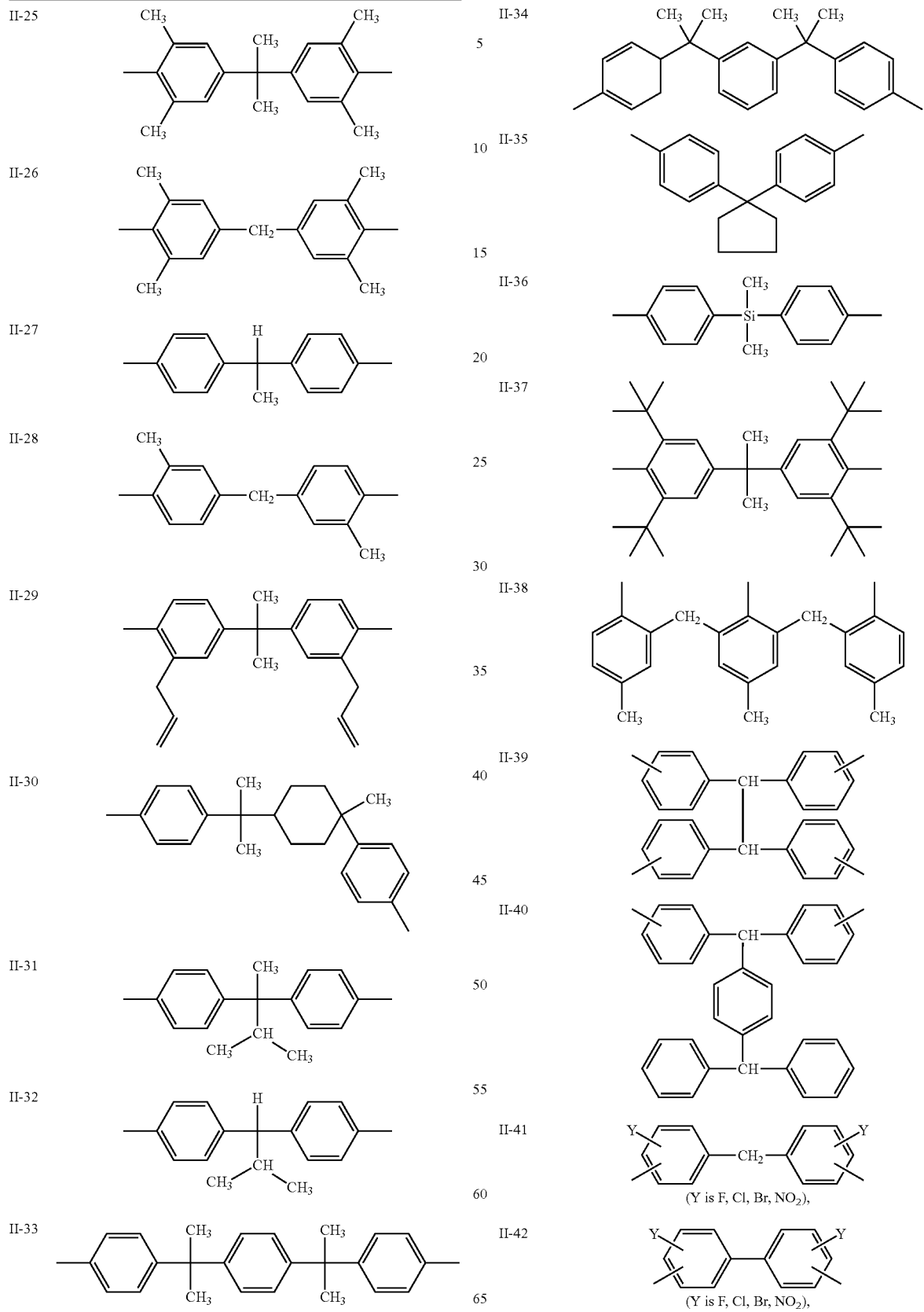

-continued

II-43 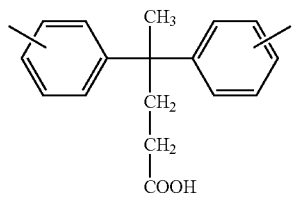

II-44 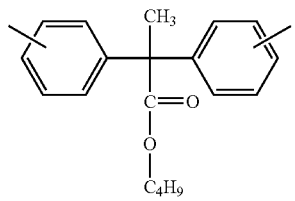

In formula (I), X represents a divalent/trivalent group. Suitable examples of X include, but are not limited to: an oxy group (—O—), a thio group (—S—), an oxycarbonyl group (—COO—), a thiocarbonyl group (—COS—), a carbamate group (—OCO—NH—), an imide group (—CO—NH—OC—), an amide group (—CO—NH—), a carbonate group (—OCOO—) and the like, or a divalent group in which two or more of them are combined. L represents a divalent linking group. Suitable examples of L include: a divalent hydrocarbon group represented by —$C_mH_{2m}$—, —$C_mH_{2m-2}$—, —$C_mH_{2m-4}$— (m is an integer of 1 to about 15, such as from 2 to about 10), —$CH_2$—$C_6H_4$— or —$C_6H_4$—$C_6H_4$—, or a divalent group in which two or more of them are combined. The divalent group L may also optionally have a substituent group such as an alkyl group, a phenyl group, an alkoxyl group or an amino group on its side chain. R represents a hydrogen atom, a lower alkyl group or an aryl group. R' represents a lower alkyl group. In addition, n is an integer, which can be 0, 1 or 2, and m is an integer, which can be from 1 to 10, such as from 1 to 5.

Typical examples of the reactive siloxane-containing compounds include compounds such as Compounds III-V:

however, that the amounts of reactive siloxane-containing binder materials can vary widely because the apparatus of embodiments may be used to prepare very dilute solutions of sol-gel materials or very concentrated or neat mixtures of siloxane materials.

Suitable reactive siloxane-containing hole-transport molecules for use in embodiments include silicon-containing arylamine compounds, such as, for example, Compound (VI), and the like.

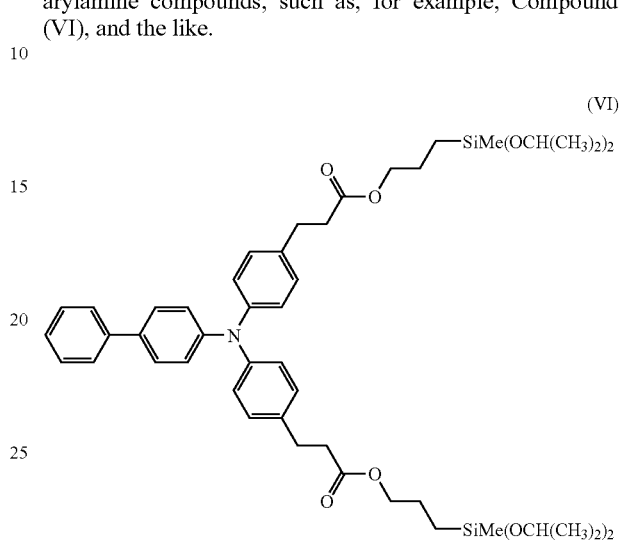

In embodiments, the reactive siloxane-containing hole-transport molecules may be reacted in amounts from about 5 to about 50% by weight, or from about 10 to about 15% by weight, based on the total weight of the reactants.

In addition, additional sol-gel precursor materials may include known compounds comprising alkoxysilyl or hydroxysilyl groups suitable for use embodiments include: alkyltrialkoxysilanes, such as, phenyltrimethloxysilanes, methyltrimethoxysilane, methyltriethoxysilane, 3-glycidoxypropyltrimethoxysilane, 3-trifluoropropyltrimethoxysilane, methacryloxypropyltriethoxysilane, triethoxysilylisobutyl-POSS (POSS is polyhedral oligomeric silsesquioxane), octa

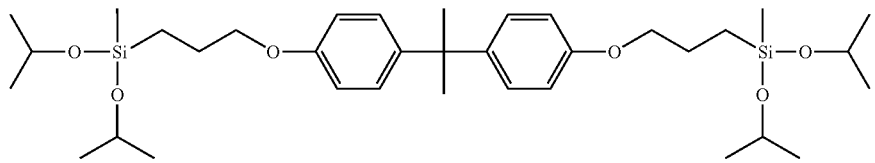

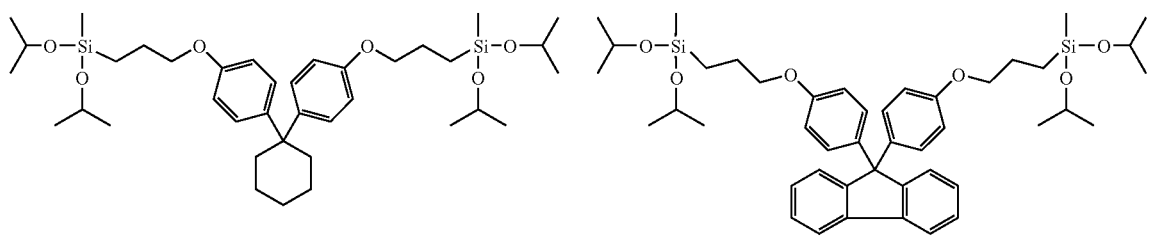

In embodiments, the reactive siloxane-containing binder materials may be reacted in amounts from about 0.01 to about 99% by weight, or from about 5 to about 20% by weight, based on the total weight of the reactants. It should be noted, (trichlorosilylethyl)-POSS, and the like; tetraalkoxysilanes, such as, tetramethoxysilane ("TMOS"), tetraethoxysilane ("TEOS") and oligomeric condensates of TEOS such as ethylsilicate 40, tetraisopropoxysilane, tetrapropoxysilane, tetraisobutoxysilane, tetrabutoxysilane, and the like. Other siloxane compounds include bis(triethoxysilyl)methane, 1,9-bis(triethoxysilyl)nonane, diethoxydichlorosilane, triethoxychlorosilane, and the like. Other suitable precursor sol-gel materials include titanium (IV) isopropoxide, titanium (IV) methoxide, diisopropoxybisethylacetoacetato titanate, triethanolamine titanate, triethanolamine zirconate, aluminum sec-butoxide, and the like.

In embodiments, additional sol-gel precursor materials may be reacted in amounts from about 0.01 to about 100% by weight, or from about 5 to about 20% by weight, based on the total weight of the reactants.

The sol-gel precursor materials may be stirred together to ensure complete mixing. Complete mixing of the sol-gel precursor materials may be carried out in any suitable solvent or mixture of solvents. Suitable solvents include, for example, the solvents include alcohols, such as methanol, ethanol, isopropanol and the like; alkanes, such as hexane, decane and the like; ethers, such as diethyl ether, tetrahydrofuran, dimethoxyethane and the like; aromatic solvents, such as toluene, xylene, benzene and the like; and mixtures thereof. The choice of specific solvent or mixture of solvents can be decided based on the solubility of the starting materials and final products, and will be readily apparent or within routine experimentation to those skilled in the art.

After the sol-gel precursor mixture of embodiments are completely blended, water and methanol or other additional solvents may be added to vessel 201. In embodiments, the proportions of water and of methanol or other cosolvents may be determined based on the desired solution viscosity and desired degree of polymerization, respectively. Experimental methods for determining of these amounts will be obvious to those skilled in the art.

The sol-gel precursor mixture, water and methanol may be stirred together in vessel 201 by stirring means 202 and circulated through the first circulation loop to ensure complete mixing. After the reaction mixture has been blended completely, the circulation pattern may be changed to allow the reaction mixture to circulate through the second circulation loop. By allowing the reaction mixture to flow through the second circulation loop, the sol-gel precursor materials, methanol and water are brought into contact with the solid state catalyst in the fluidized bed reaction column 206.

Temperature may affect catalytic reaction in embodiments. Suitable reaction temperatures may be chosen based on the desired degree of polymerization. It will be obvious to those skilled in the art that the higher the temperature the higher degree of polymerization in combination and consideration of the amount of water present. Experimental methods for the determination of the desired degree of polymerization will also be obvious to those skilled in the art.

In embodiments, the reaction mixture is allowed to circulate through the second reaction loop until a desired oligomerization ratio is obtained. The oligomerization ratio is determined by comparing the amount of monomer-like sol-gel precursor components present with the amount of oligomer-like components present, based on gas phase chromatography of samples taken from the reaction system. In embodiments, the reaction mixture is allowed to circulate through the second circulation loop and the reaction is allowed to continue until an oligomerization ratio of monomer-like components:oligomer-like components of about 1:1 is obtained. This ratio may be measured by standard experimental techniques, such as gel permeation chromatography. It will be obvious to those skilled in the art that this apparatus can be used to produce sol-gel materials of any desired oligomer ratio and that the oligomer ratio will depend on amount of water time in the apparatus and the temperature of the apparatus and the desired ratio will depend on a number of factor including desired solution viscosity of the produced solution.

After the oligomerization ratio is obtained, the circulation pattern is again changed and the reaction mixture is returned to vessel 201. At this time, additional sol-gel layer components may be added. The additional sol-gel layer components may include stabilizers, antioxidants, polymeric binder materials and surfactants.

In embodiments, one or more stabilizers may be added. Suitable stabilizers include, for example, aluminum(III) acetylacetonate (Al(AcAc)$_3$), acetylacetonate (AcAc) and mixtures thereof, although other known and later discovered stabilizers may be used in embodiments.

In embodiments, one or more antioxidants may be added. Suitable antioxidants may include antioxidants having a hindered-phenol, hindered-amine, thioether or phosphite partial structure. This is effective for improvement of potential stability and image quality in environmental variation. The anltioxidants include an antioxidant having a hindered-phenol, hindered-amine, thioether or phosphite partial structure. This is effective for improvement of potential stability and image quality in environmental variation. For example, the hindered-phenol antioxidants include SUMILIZER BHT-R, SUMILIZER MDP-S, SUMILIZER BBM-S, SUMILIZER WX-R, SUMILIZER NW, SUMILIZER BP-76, SUMILIZER BP-101, SUMILIZER GA-80, SUMILIZER GM and SUMILIZER GS (the above are manufactured by Sumitomo Chemical Co., Ltd.), IRGANOX 1010, IRGANOX 1035, IRGANOX 1076, IRGANOX 1098, IRGANOX 1135, IRGANOX 1141, IRGANOX 1222, IRGANOX 1330, IRGANOX 1425WLj, IRGANOX 1520Lj, IRGANOX 245, IRGANOX 259, IRGANOX 3114, IRGANOX 3790, IRGANOX 5057 and IRGANOX 565 (the above are manufactured by Ciba Specialty Chemicals), and ADECASTAB AO-20, ADECASTAB AO-30, ADECASTAB AO-40, ADECASTAB AO-50, ADECASTAB AO-60, ADECASTAB AO-70, ADECASTAB AO-80 and ADECASTAB AO-330i (the above are manufactured by Asahi Denka Co., Ltd.). The hindered-amine antioxidants include SANOL LS2626, SANOL LS765, SANOL LS770, SANOL LS744, TINUVIN 144, TINUVIN 622LD, MARK LA57, MARK LA67, MARK LA62, MARK LA68, MARK LA63 and SUMILIZER TPS, and the phosphite antioxidants include MARK 2112, MARK PEP•8, MARK PEP•24G, MARK PEP•36, MARK 329K and MARK HP•10. Of these, hindered-phenol and hindered-amine antioxidants may be particularly suitable, in embodiments.

In embodiments, the polymeric binder may be a resin soluble in a liquid component in a coating solution used for formation of a silicon-containing layer. Such a resin soluble in the liquid component may be selected based upon the kind of liquid component. For example, if the coating solution contains an alcoholic solvent, a polyvinyl acetal resin such as a polyvinyl butyral resin, a polyvinyl formal resin or a partially acetalized polyvinyl acetal resin in which butyral is partially modified with formal or acetoacetal, a polyamide resin, a cellulose resin such as ethyl cellulose and a phenol resin may be suitably chosen as the alcohol-soluble resins. These resins may be used either alone or as a combination of two or more resins. Of the above-mentioned resins, the polyvinyl acetal resin is particularly suitable in embodiments in terms of electric characteristics.

In embodiments, the weight-average molecular weight of the polymeric binder component may be from about 2,000 to about 1,000,000, such as from about 5,000 to about 50,000.

When the weight-average molecular weight is less than about 2,000, enhancing discharge-gas resistance, mechanical strength, scratch resistance, particle dispersibility, etc., tend to become insufficient. However, when the weight-average molecular weight exceeds about 1,000,000, the resin solubility in the coating solution decreases, and the amount of resin added to the coating solution may be limited and poor film formation may result.

Further, the amount of the polymeric binder may be, in embodiments, from about 0.1 to about 15% by weight, or from about 0.5 to about 10% by weight, based on the total amount of the coating solution. When the amount added is less than 0.1% by weight, enhancing discharge-gas resistance, mechanical strength, scratch resistance, particle dispersibility, etc. tend to become insufficient. However, if the amount of the polymeric binder exceeds about 15% by weight, there is a tendency for formation of indistinct images when the electrophotographic photoreceptor of the disclosure is used at high temperature and high humidity.

In embodiments, one or more surfactant may be added. Suitable surfactants include, for example, polyethylene glycol surfactants, polydimethylsiloxane surfactants that are grafted with polyethylene glycol groups, and perfluoropolyethylene glycol surfactants having terminal reactive aminopropylsiloxane residues, such as the surfactant commercially available as FLUOROLINK S-10, although other known and later discovered surfactants may be used in embodiments.

Once the oligomerized reaction mixture and any additional components have been combined, the polymer gel formed by the sol-gel process may be applied to a desired substrate and dried by slowly heating to vaporize the volatile species, such as alcohol. Drying of the alcohol should occur slowly, because rapid drying may result in non-uniform gel shrinkage, which may then cause cracking.

The sol-gel solutions and layers produced by the apparatuses and processes of embodiments can be used for any known or later developed sol-gel application, including the production of photoreceptor layers. An exemplar, electrostatographic imaging member will now be described in greater detail.

In electrophotographic photoreceptors of embodiments, the photoreceptors can include various layers such as undercoating layers, charge-generating layers, charge-transport layers, overcoat layers, and the like. The overcoating layers of embodiments can be a silicon compound-containing layer, which can be a layer formed by the sol-gel process described above.

Various fine particles can also be added to the silicon compound-containing layer, for example, to further improve the stain adhesion resistance and lubricity of embodiments of the electrophotographic photoreceptor. The fine particles may be used either alone or as a combination of two or more such fine particles. Non-limiting examples of the fine particles include fine particles containing silicon, such as fine particles containing silicon as a constituent element, and specifically include colloidal silica and fine silicone particles. The content of the fine silicone particles in the silicon-containing layer of embodiments may be within the range of 0.1 to 20% by weight, or within the range of 0.5 to 10% by weight, based on the total solid content of the silicon-containing layer.

Colloidal silica used in embodiments as the fine particles containing silicon in the disclosure is selected from an acidic or alkaline aqueous dispersion of the fine particles having an average particle size of 1 to 100 nm, or 10 to 30 nm, and a dispersion of the fine particles in an organic solvent, such as an alcohol, a ketone or an ester, and generally, commercially available particles can be used.

There is no particular limitation on the solid content of colloidal silica in a top-surface layer of the electrophotographic photoreceptor of embodiments. However, in embodiments, colloidal silica may be included in amounts of from about 1 to about 50% by weight, such as from about 5 to about 30% by weight, based on the total solid content of the top surface layer, in terms of film forming properties, electric characteristics and strength.

The fine silicone particles used as the fine particles containing silicon in the disclosure may be selected from silicone resin particles, silicone rubber particles and silica particles surface-treated with silicone, which are spherical and have an average particle size of from about 1 to 500 nm, such as from about 10 to about 100 nm, and generally, commercially available particles can be used in embodiments.

In embodiments, the fine silicone particles are small-sized particles that are chemically inactive and excellent in dispersibility in a resin, and further are low in content as may be necessary for obtaining sufficient characteristics. Accordingly, the surface properties of the electrophotographic photoreceptor can be improved without inhibition of the cross-linking reaction. That is to say, fine silicone particles improve the lubricity and water repellency electrophotographic photoreceptor surfaces where incorporated into strong cross-linked structures, which may then be able to maintain good wear resistance and stain-adhesion resistance for a long period of time. The content of the fine silicone particles in the silicon compound-containing layer of embodiments may be from about 0.1 to about 20% by weight, such as from about 0.5 to about 10% by weight, based on the total solid content of the silicon compound-containing layer.

Other fine particles that may be used in embodiments include fine fluorine-based particles such as ethylene tetrafluoride, ethylene trifluoride, propylene hexafluoride, vinyl fluoride and vinylidene fluoride, and semiconductive metal oxides such as $ZnO$—$Al_2O_3$, $SnO_2$—$Sb_2O_3$, $In_2O_3$—$SnO_2$, $ZnO$—$TiO_2$, $MgO$—$Al_2O_3$, $FeO$—$TiO_2$, $TiO_2$, $SnO_2$, $In_2O_3$, $ZnO$ and $MgO$.

In conventional electrophotographic photoreceptors, when the above-mentioned fine particles are contained in the photosensitive layer, the compatibility of the fine particles with a charge-transport substance or a binding resin may become insufficient, which causes layer separation in the photosensitive layer, and thus the formation of an opaque film. As a result, the electric characteristics have deteriorated in some cases. In contrast, the silicon compound-containing layer of embodiments may contain the resin soluble in the liquid component in the coating solution used for formation of this layer and the silicon compound, thereby improving the dispersibility of the fine particles in the silicon compound-containing layer. Accordingly, the pot life of the coating solution may be sufficiently prolonged, and deterioration of the electric characteristics may be prevented.

Further, an additive such as a plasticizer, a surface modifier, an antioxidant, or an agent for preventing deterioration by light can also be used in the silicon compound-containing layer of embodiments. Non-limiting examples of plasticizers that may be used in embodiments include, for example, biphenyl, biphenyl chloride, terphenyl, dibutyl phthalate, diethylene glycol phthalate, dioctyl phthalate, triphenylphosphoric acid, methylnaphthalene, benzophenone, chlorinated paraffin, polypropylene, polystyrene and various fluorohydrocarbons.

There is no particular limitation on the thickness of the silicon-containing layer, however, in embodiments, the silicon-containing layer may be from about 2 to about 5 μm in thickness, such as from about 2.7 to about 3.2 μm in thickness.

The electrophotographic photoreceptor of embodiments may be either a function-separation-type photoreceptor, in which a layer containing a charge-generation substance (charge-generation layer) and a layer containing a charge-transport substance (charge-transport layer) are separately provided, or a monolayer-type photoreceptor, in which both the charge-generation layer and the charge-transport layer are contained in the same layer, as long as the electrophotographic photoreceptor of the particular embodiment has the photosensitive layer provided with the above-mentioned silicon compound-containing layer. The electrophotographic photoreceptor will be described in greater detail below, taking the function-separation-type photoreceptor as an example.

FIG. 1 is a cross-sectional view schematically showing an embodiment of the electrophotographic photoreceptor of the disclosure. The electrophotographic photoreceptor 1 shown in FIG. 1 is a function-separation-type photoreceptor in which a charge-generation layer 13 and a charge-transport layer 14 are separately provided. That is, an underlayer 12, the charge-generation layer 13, the charge transport layer 14 and a protective layer 15 are laminated onto a conductive support 11 to form a photosensitive layer 16. The protective layer 15 contains a resin soluble in the liquid component contained in the coating solution used for formation of this layer and the silicon compound. The various layers of the photoreceptor shown in FIG. 1 are generally known, and are described in detail in the above-mentioned commonly owned and co-pending applications.

The electrophotographic photoreceptor of embodiments should lot be construed as being limited to the above-mentioned constitution. For example, the electrophotographic photoreceptor shown in FIG. 1 is provided with the protective layer 15. However, when the charge-transport layer 14 contains the resin soluble in the liquid component in the coating solution used for formation of this layer and the silicon compound, the charge-transport layer 14 may be used as a top surface layer (a layer on the side farthest apart from the support 11) without using the protective layer 15. In this case, the charge-transport substance contained in the charge-transport layer 14 is desirably soluble in the liquid component in the coating solution used for formation of the charge-transport layer 14. For example, when the coating solution used for formation of the charge-transport layer 14 contains an alcohol solvent, the silicon compounds described above, including arylamine derivatives prepared by processes that include selective hydrogenation by catalytic transfer, can be used as the charge-transport substances.

Figure 2:
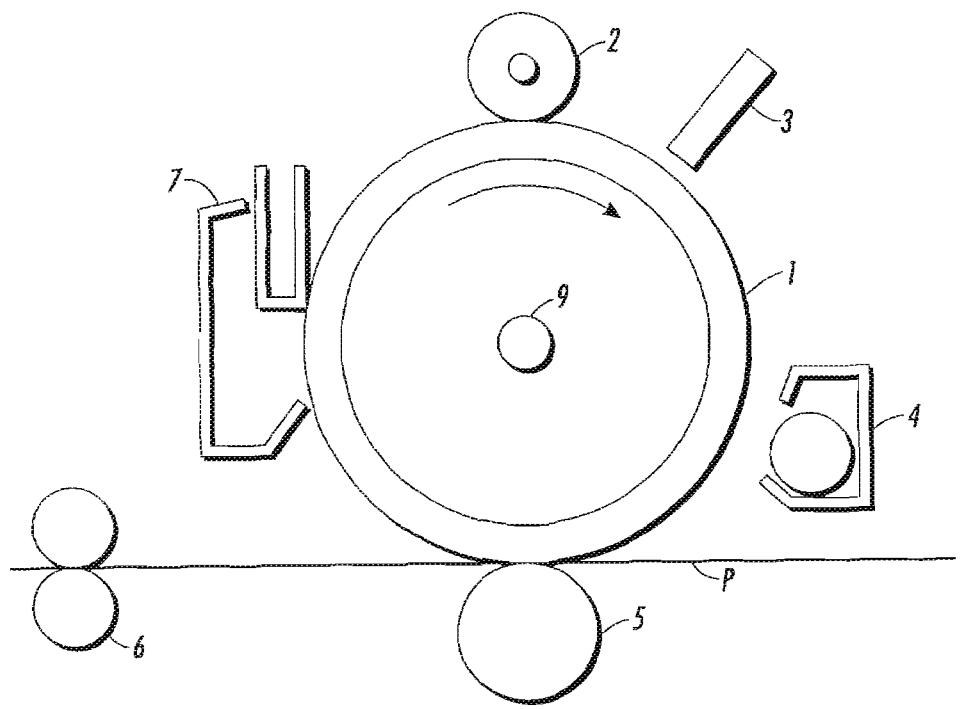
FIG. 2 is a schematic view showing an embodiment of an image forming apparatus of the disclosure.

FIG. 2 is a schematic view showing an embodiment of an image forming apparatus or xerographic machine. In the apparatus shown in FIG. 2, an electrophotographic photoreceptor 1 is supported by a support 9, and rotatable at a specified rotational speed in the direction indicated by the arrow, centered on the support 9. A charging device 2, an exposure device 3, a developing device 4, a transfer device 5 and a cleaning unit 7 are arranged in this order along the rotational direction of the electrophotographic photoreceptor 1. Further, this exemplary apparatus is equipped with an image fixing device 6, and a medium P to which a toner image is to be transferred is conveyed to the image fixing device 6 through the transfer device 5.

Figure 3:
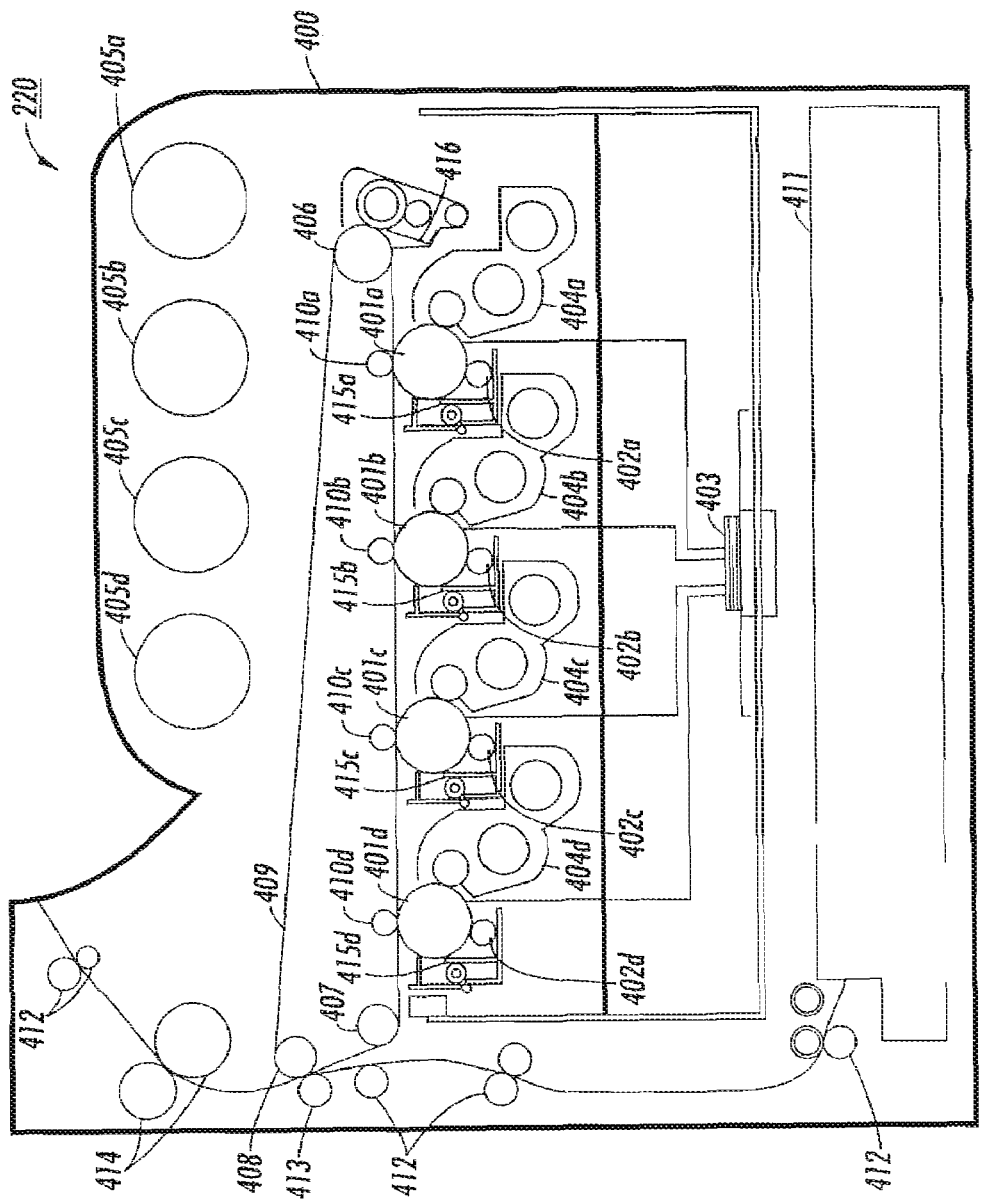
FIG. 3 is a schematic view showing another embodiment of an image forming apparatus of the disclosure.

FIG. 3 is a cross-sectional view showing another exemplary embodiment of an image-forming apparatus. The image-forming apparatus 220 shown in FIG. 3 is an image-forming apparatus of an intermediate-transfer system, and tour electrophotographic photoreceptors 401a to 401d are arranged in parallel with each other along an intermediate-transfer belt 409 in a housing 400.

Here, the electrophotographic photoreceptors 401a to 401d carried by the image-forming apparatus 220 are each the electrophotographic photoreceptors. Each of the electrophotographic photoreceptors 401a to 401d may rotate in a predetermined direction (counterclockwise on the sheet of FIG. 3), and charging rolls 402a to 402d, developing device 404a to 404d, primary transfer rolls 410a to 410d and cleaning blades 415a to 415d are each arranged along the rotational direction thereof. In each of the developing device 404a to 404d, four-color toners of yellow (Y), magenta (M), cyan (C) and black (B) contained in toner cartridges 405a to 405d can be supplied, and the primary transfer rolls 410a to 410d are each brought into abutting contact with the electrophotographic photoreceptors 401a to 401d through an intermediate-transfer belt 409.

Further, a laser-light source (exposure unit) 403 is arranged at a specified position in the housing 400, and it is possible to irradiate surfaces of the electrophotographic photoreceptors 401a to 401d after charging with laser light emitted from the laser-light source 403. This performs the respective steps of charging, exposure, development, primary transfer and cleaning in turn in the rotation step of the electrophotographic photoreceptors 401a to 401d, and toner images of the respective colors are transferred onto the intermediate-transfer belt 409, one over the other.

The intermediate-transfer belt 409 is supported with a driving roll 406, a backup roll 408 and a tension roll 407 at a specified tension, and rotatable by the rotation of these rolls without the occurrence of deflection. Further, a secondary transfer roll 413 is arranged so that it is brought into abutting contact with the backup roll 408 through the intermediate-transfer belt 409. The intermediate-transfer belt 409, which has passed between the backup roll 408 and the secondary transfer roll 413, is cleaned up by a cleaning blade 416, and then repeatedly subjected to the subsequent image-formation process.

Further, a tray (tray for a medium to which a toner image is to be transferred) 411 is provided at a specified position in the housing 400. The medium to which the toner image is to be transferred (such as paper) in the tray 411 is conveyed in turn between the intermediate-transfer belt 409 and the secondary transfer roll 413, and further between two fixing rolls 414 brought into abutting contact with each other, with a conveying roll 412, and then delivered out of the housing 400.

According to the exemplary image-forming apparatus 220 shown in FIG. 3, the use of electrophotographic photoreceptors of embodiments as electrophotographic photoreceptors 401a to 401d may achieve discharge gas resistance, mechanical strength scratch resistance, etc. on a sufficiently high level in the image-formation process of each of the electrophotographic photoreceptors 401a to 401d. Accordingly, even when the photoreceptors are used together with the contact-charging devices or the cleaning blades, or further with the spherical toner obtained by chemical polymerization, good image quality can be obtained without the occurrence of image defects such as fogging. Therefore, also according to the image-forming apparatus for color-image formation using the intermediate-transfer body, such as this embodiment, the image-forming apparatus, which can stably provide good image quality for a long period of time, is realized.

The disclosure should not be construed as being limited to the above-mentioned embodiments. For example, each apparatus shown in FIG. 2 or 3 may be equipped with a process cartridge comprising the electrophotographic photoreceptor 1 (or the electrophotographic photoreceptors 401a to 401d) and charging device 2 (or the charging devices 402a to 402d). The use of such a process cartridge allows maintenance to be performed more simply and easily.

Further, in embodiments, when a charging device of the non-contact charging system such as a corotron charger is used in place of the contact-charging device 2 (or the contact-charging devices 402a to 402d), sufficiently good image quality can be obtained.

Specific examples are described in detail below. These examples are intended to be illustrative, and the materials, conditions, and process parameters set forth in these exemplary embodiments are not limiting. All parts and percentages are by weight unless otherwise indicated.

EXAMPLES

Examples 1-4

Preparation of Sol-Gel Solutions in a 1 L System

An apparatus was provided including a 1 L vessel containing a stirring means, a pump, a heat exchanger, a fluidized bed reaction column having a 0.33 L capacity and fluid lines connecting the vessel pump, heat exchanger and a fluidized bed reaction column in two circulation loops. The first circulation loop of the apparatus includes the vessel, a fluid line to the pump, a fluid line to the heat exchanger and a fluid line connecting back to the vessel. A second circulation loop of the apparatus includes the vessel, a fluid line to the pump, a fluid line to the heat exchanger, a fluid line connecting to the fluidized bed reaction column and another fluid line connecting to the vessel. The fluidized bed reaction column includes 7.22 grams of a solid state acid catalyst AMBERLYST H-15.

Example 1

Sol-Gel Solution Including Compound III

The vessel is charged with 84.48 grams of Compound III, 72.24 grams of methanol, 265.31 grams of n-butanol and 32.31 grams of water. This solution was mixed completely, and allowed to circulate through the first circulation loop. The reaction mixture was then allowed to circulate through the second circulation loop and contact with the catalyst at a flow rate of 300 mL/min and a temperature of about 22.5° C. After 4 to 6 hours, the circulation path was changed to return the reaction mixture to the vessel; 1.182 grams of aluminum (III) acetylacetonate, 1.182 grams of 2,4-pentanedione, 13.135 grams of polyvinylbutyrol, 1.182 grams of 2,6-di-tert-butyl-4-methylphenol, 1.714 grams of IRGANOX-259 antioxidant and 0.09 grams of FLUOROLINK S-10 were added; and the resulting mixture was stirred to homogenize.

Example 2

Sol-Gel Solutions Including Compound IV

Sol-gel solutions were prepared according to Example 1, except that 84.48 grams of Compound IV was substituted for Compound III.

Example 3

Sol-Gel Solutions Including Compound V

Sol-gel solutions were prepared according to Example 1, except that 84.48 grams of Compound V was substituted for Compound III.

Example 4

Sol-Gel Solutions Including Compound IV and Compound VI

Sol-gel solutions were prepared according to Example 1, except that a mixture, which included 80.04 grams of Compound VI and 43.66 grams of Compound IV, was substituted for Compound III.

Examples 5-8

Preparation of Sol-Gel Solutions in a 6L System

An apparatus was provided including a 12 L vessel containing a stirring means, a pump, a heat exchanger, a fluidized bed reaction column having a 2 L capacity and fluid lines connecting the vessel pump, heat exchanger and a fluidized bed reaction column in two circulation loops. The first circulation loop of the apparatus includes the vessel, a fluid line to the pump, a fluid line to the heat exchanger and a fluid line connecting back to the vessel. A second circulation loop of the apparatus includes the vessel, a fluid line to the pump, a fluid line to the heat exchanger, a fluid line connecting to the fluidized bed reaction column and another fluid line connecting to the vessel. The fluidized bed reaction column includes 80.03 grams of a solid state acid catalyst, AMBERLYST H-15.

Example 5

Sol-Gel Solution Including Compound III

The vessel is charged with 934.60 grams of Compound III, 751.85 grams of methanol, 2761.33 grams of n-butanol and 3336.28 grams of water. This solution was mixed completely, and allowed to circulate through the first circulation loop. The reaction mixture was then allowed to circulate through the second circulation loop and contact with the catalyst at a flow rate of 2 l/min and a temperature of about 22.5° C. After 4 to 6 hours, the circulation path was changed to return the reaction mixture to the vessel: 12.30 grams of aluminum (III) acetylacetonate, 12.30 grams of 2,4-pentandione, 136.70 grams of polyvinylbutyrol, 12.30 grams of 2,6-di-tert-butyl-4-methylphenol, 17.84 grams of IRGANOX-259 antioxidant and 0.94 grams of FLUOROLINK S-10 were added; and the resulting mixture was stirred to homogenize.

Example 6

Sol-Gel Solutions Including Compound IV

Sol-gel solutions were prepared according to Example 4, except that 934.60 grams of Compound V was substituted for Compound III.

Example 7

Sol-Gel Solutions Including Compound V

Sol-gel solutions were prepared according to Example 4, except that 934.60 grams of Compound V was substituted for Compound III.

Example 8

Sol-Gel Solutions Including Compound IV and Compound VI

Sol-gel solutions were prepared according to Example 4, except that a mixture, which included 800.36 grams of Compound VI and 436.56 grams of Compound IV, was substituted for Compound III.

It will be appreciated that various of the above-discussed and other features and functions, or alternatives thereof may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An apparatus for preparing sol-gel solutions, comprising:
   a vessel optionally containing a stirrer;
   a pump;
   a fluidized bed reaction column having an upper portion, a body and a lower portion; and
   multiple fluid lines;
   wherein the fluid lines connect the vessel and the pump in a first circulation loop and the fluid lines connect the vessel, the pump and the fluidized bed reaction column in a second circulation loop,
   wherein the upper portion and the body are separated by a first fluid permeable membrane,
   wherein the lower portion is connected to the fluid lines by a connector, and the lower portion and the connector are separated by a second fluid permeable membrane, and
   wherein the body contains a solid state acid catalyst that is not permeable through the first fluid permeable membrane or the second fluid permeable membrane.

2. The apparatus according to claim 1, wherein the first circulation loop further comprises a heat exchanger.

3. The apparatus according to claim 1, wherein the lower portion has a substantially conical shape in which a wider portion of the conical shape is connected to the body and a narrower portion of the conical shape connects to the connector.

4. The apparatus according to claim 3, wherein the lower portion has a substantially conical shape in which an angle at a projected vertex of the conical shape is from about 1 to about 175 degrees.

5. The apparatus according to claim 3, wherein the lower portion has a substantially conical shape in which an angle at a projected vertex of the conical shape is from about 30 to about 90 degrees.

6. The apparatus according to claim 3, wherein the lower portion has a substantially conical shape in which an angle at a projected vertex of the conical shape is from about 40 to about 60 degrees.

7. A method for preparing a sol-gel solution, comprising:
   providing an apparatus that comprises:
      a vessel optionally containing a stirrer,
      a pump,
      a fluidized bed reaction column having an upper portion, a body and a lower portion, and
      multiple fluid lines,
      wherein the fluid lines connect the vessel and the pump in a first circulation loop and the fluid lines connect the vessel, the pump and the fluidized bed reaction column in a second circulation loop, the upper portion and the body are separated by a first fluid permeable membrane the lower portion is connected to the fluid lines by a connector, and lower portion and the connector are separated by a second fluid permeable membrane; and the body contains a solid state acid catalyst that is not permeable through the first fluid permeable membrane or the second fluid permeable membrane;
   providing sol-gel precursor materials to the vessel;
   blending the sol-gel precursor materials, water and methanol with an optional solvent;
   circulating the mixture through a first circulation loop; and
   reacting the sol-gel precursor materials by circulating the mixture through the second circulation loop and contacting the sol-gel precursor materials with the solid state acid catalyst.

8. The method according to claim 7, wherein the sol-gel precursor materials are chosen from the group consisting of reactive siloxane-containing binder materials, reactive siloxane-containing hole-transport materials and mixtures thereof.

9. The method according to claim 8, wherein the reactive siloxane-containing hole-transport materials are chosen from aromatic silicon-containing compounds and mixtures thereof.

10. The method according to claim 9, wherein the aromatic silicon-containing compounds are chosen from

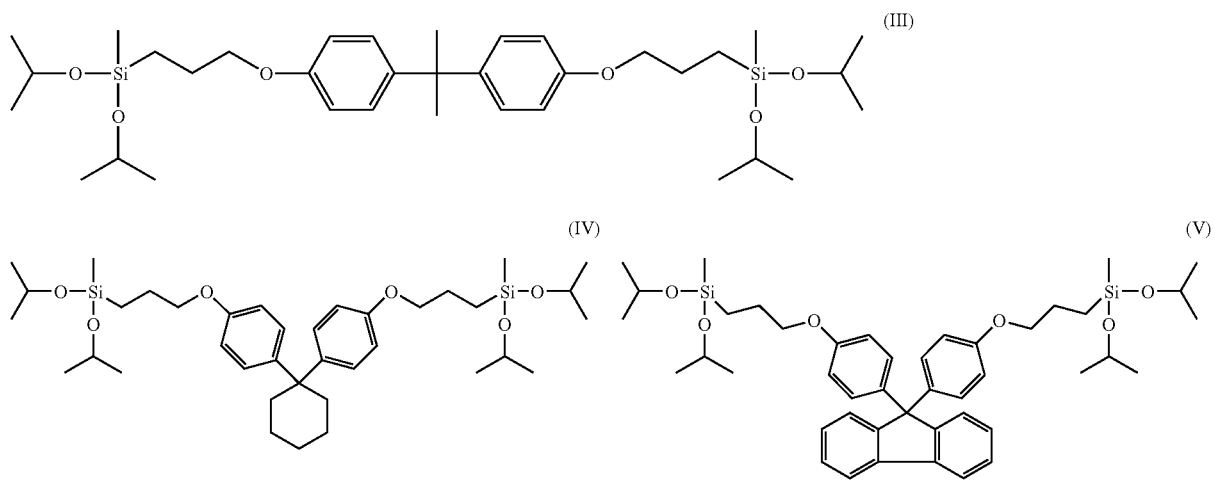

and mixtures thereof.

11. The method according to claim 8, wherein the reactive siloxane-containing hole-transport materials are chosen from silicon-containing arylamine compounds and mixtures thereof.

12. The method according to claim 8, wherein the reactive siloxane-containing hole-transport materials are Compound (VI)

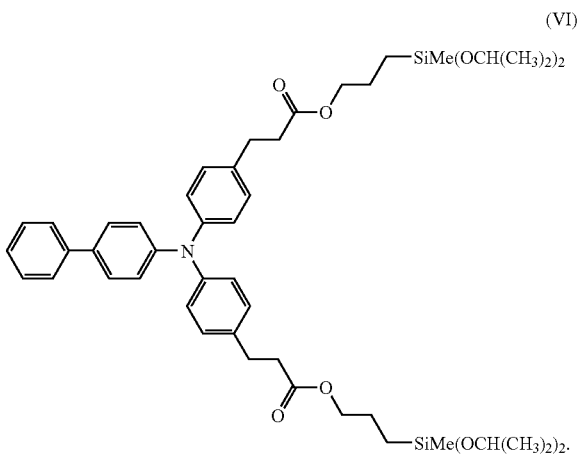

(VI)

13. The method according to claim 8, wherein the reactive siloxane-containing hole-transport materials may be reacted in amounts from about 0.01 to about 99% by weight, based on the total weight of the reactants.

14. The method according to claim 7, further comprising incorporating into the reacted mixture one or more of stabilizers, antioxidants, polymeric binder materials and surfactants.

15. The method according to claim 14, wherein the stabilizers are chosen from the group consisting of aluminum(III) acetylacetonate ($Al(AcAc)_3$), acetylacetonate (AcAc) and mixtures thereof.

16. The method according to claim 14, wherein the antioxidants are chosen from the group consisting of antioxidants having a hindered-phenol, hindered-amine, thioether or phosphite partial structure.

17. The method according to claim 14, wherein the polymeric binders are chosen from the group consisting of polyvinyl acetal resins, polyamide resins, cellulose resins and phenol resins and mixtures thereof.

18. The method according to claim 14, wherein the surfactants are chosen from the group consisting of polyethylene glycol surfactants, polydimethylsiloxane surfactants grafted with polyethylene glycol groups and perfluoropolyethylene glycol surfactants having terminal reactive aminopropylsiloxane residues.

* * * * *